United States Patent
Lu et al.

(10) Patent No.: US 9,674,084 B2
(45) Date of Patent: Jun. 6, 2017

(54) PACKET PROCESSING APPARATUS USING PACKET PROCESSING UNITS LOCATED AT PARALLEL PACKET FLOW PATHS AND WITH DIFFERENT PROGRAMMABILITY

(71) Applicant: MEDIATEK INC., Hsin-Chu (TW)

(72) Inventors: Kuo-Cheng Lu, Hsinchu (TW); Chang-Due Young, Kaohsiung (TW)

(73) Assignee: Nephos (Hefei) Co. Ltd., Hefei, Anhui, PR (US)

( * ) Notice: Subject to any disclaimer, the term of this patent is extended or adjusted under 35 U.S.C. 154(b) by 151 days.

(21) Appl. No.: 14/462,575

(22) Filed: Aug. 19, 2014

(65) Prior Publication Data

US 2015/0138976 A1 May 21, 2015

Related U.S. Application Data (60) Provisional application No. 61/907,378, filed on Nov. 21, 2013.

(51) Int. Cl.
*H04L 12/851* (2013.01)
*H04L 12/861* (2013.01)
(Continued)

(52) U.S. Cl.
CPC .......... *H04L 45/60* (2013.01); *H04L 47/2441* (2013.01); *H04L 47/62* (2013.01);
(Continued)

(58) Field of Classification Search
CPC . H04L 47/2441; H04L 49/30; H04L 49/1546; H04L 47/62; H04L 49/9057;
(Continued)

(56) References Cited

U.S. PATENT DOCUMENTS 7,330,468 B1 2/2008 Tse-Au
8,817,625 B1 8/2014 Zhang
(Continued)

FOREIGN PATENT DOCUMENTS

| TW | 201345214 A | 11/2013 |
|---|---|---|
| TW | 201347487 A | 11/2013 |
| WO | 2007088525 A2 | 8/2007 |

OTHER PUBLICATIONS

Kuo-Cheng Lu et al., Title: Packet Processing Apparatus Using Action Command Parameterization, pending U.S. Appl. No. 14/469,607, filed Aug. 27, 2014.

*Primary Examiner* — Kwang B Yao
*Assistant Examiner* — Moo Ryong Jeong
(74) *Attorney, Agent, or Firm* — Winston Hsu (57) ABSTRACT

A packet processing apparatus has an ingress packet processing circuit, an egress packet processing circuit, and a traffic manager. The ingress packet processing circuit processes ingress packets received from ingress ports. The egress packet processing circuit processes egress packets to be forwarded through egress ports. The traffic manager deals with at least packet queuing and scheduling. At least one of the ingress packet processing circuit and the egress packet processing circuit includes a first packet processing unit located at a first packet flow path, and a second packet processing unit located at a second packet flow path. The first packet flow path is parallel with the second packet flow path, and programmability of the first packet processing unit is higher than programmability of the second packet processing unit.

8 Claims, 7 Drawing Sheets

(51) Int. Cl.
*H04L 12/863* (2013.01)
*H04L 12/933* (2013.01)
*H04L 12/935* (2013.01)
*H04L 12/773* (2013.01)

(52) U.S. Cl.
CPC ...... H04L 49/1523 (2013.01); H04L 49/1546 (2013.01); H04L 49/30 (2013.01); H04L 49/9057 (2013.01); H04L 49/153 (2013.01); H04L 49/1538 (2013.01)

(58) Field of Classification Search
CPC ... H04L 45/60; H04L 49/1538; H04L 49/153; H04L 49/1523
See application file for complete search history.

(56) References Cited

U.S. PATENT DOCUMENTS

| | | |
|---|---|---|
| 2002/0080720 A1 | 6/2002 | Pegrum |
| 2003/0037276 A1 | 2/2003 | Mo |
| 2003/0061269 A1* | 3/2003 | Hathaway ............ G06F 13/4059 709/202 |
| 2003/0063348 A1 | 4/2003 | Posey, Jr. |
| 2003/0202510 A1 | 10/2003 | Witkowski |
| 2006/0114831 A1 | 6/2006 | Buduma |
| 2007/0005248 A1 | 1/2007 | Averill |
| 2007/0183415 A1* | 8/2007 | Fischer ............... H04L 49/3009 370/389 |
| 2008/0084880 A1* | 4/2008 | Dharwadkar ....... H04L 12/4641 370/392 |
| 2011/0022732 A1 | 1/2011 | Hutchison |
| 2011/0085464 A1* | 4/2011 | Nordmark ............ H04L 49/101 370/252 |
| 2012/0177047 A1 | 7/2012 | Roitshtein |
| 2013/0223442 A1* | 8/2013 | Narayanan .............. H04L 45/64 370/389 |
| 2013/0318243 A1* | 11/2013 | Chinthalapati ......... H04L 45/52 709/226 |
| 2014/0334489 A1* | 11/2014 | Bosshart ................ H04L 47/56 370/392 |

\* cited by examiner

PACKET PROCESSING APPARATUS USING PACKET PROCESSING UNITS LOCATED AT PARALLEL PACKET FLOW PATHS AND WITH DIFFERENT PROGRAMMABILITY

CROSS REFERENCE TO RELATED APPLICATIONS

This application claims the benefit of U.S. provisional application No. 61/907,378, filed on Nov. 21, 2013 and incorporated herein by reference.

BACKGROUND

The disclosed embodiments of the present invention relate to forwarding packets, and more particularly, to a packet processing apparatus using packet processing units located at parallel packet flow paths and with different programmability.

A network switch is a computer networking device that links different electronic devices. For example, the network switch receives an incoming packet generated from a first electronic device connected to it, and transmits a modified packet or an unmodified packet derived from the received packet only to a second electronic device for which the received packet is meant to be received. To achieve better packet processing performance, the network switch may be implemented using fixed hardware circuits. However, such a network switch design has no flexibility. For example, the network switch needs to be re-designed to satisfy the requirement of a different application. Thus, there is a need for an innovative network switch design with enhanced flexibility.

SUMMARY

In accordance with exemplary embodiments of the present invention, a packet processing apparatus using packet processing units located at parallel packet flow paths and with different programmability is proposed to solve the above-mentioned problem.

According to a first aspect of the present invention, an exemplary packet processing apparatus is disclosed. The exemplary packet processing apparatus includes an ingress packet processing circuit, an egress packet processing circuit, and a traffic manager. The ingress packet processing circuit is configured to process ingress packets received from ingress ports. The egress packet processing circuit is configured to process egress packets to be forwarded through egress ports. The traffic manager is coupled between the ingress packet processing circuit and the egress packet processing circuit, wherein the traffic manager is configured to deal with at least packet queuing and scheduling. At least one packet processing circuit of the ingress packet processing circuit and the egress packet processing circuit comprises a first packet processing unit located at a first packet flow path, and a second packet processing unit located at a second packet flow path, wherein the first packet flow path is parallel with the second packet flow path, and programmability of the first packet processing unit is higher than programmability of the second packet processing unit.

According to a second aspect of the present invention, an exemplary ingress packet processing circuit for processing ingress packets received from ingress ports is disclosed. The exemplary ingress packet processing circuit comprises a first packet processing unit located at a first packet flow path, and a second packet processing unit located at a second packet flow path parallel with the first packet flow path. The first packet processing unit is fully programmable, and the second packet processing unit is fixed or semi-configurable.

According to a third aspect of the present invention, an exemplary egress packet processing circuit for processing egress packets to be forwarded through egress ports is disclosed. The exemplary egress packet processing circuit comprises a first packet processing unit located at a first packet flow path, and a second packet processing unit located at a second packet flow path parallel with the first packet flow path. The first packet processing unit is fully programmable, and the second packet processing unit is fixed or semi-configurable.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

The present invention proposes hybrid mode packet processing architecture that uses packet processing units located at parallel packet flow paths and with different programmability. In this way, when a packet processing unit with higher programmability (e.g., a flexible packet processing unit that is fully programmable) is active in an ingress packet processing pipeline or an egress packet processing pipeline of a network switch, the network switch would have better flexibility; and when a packet processing unit with lower programmability (e.g., a fixed packet processing unit or a semi-configurable packet processing unit) is active in the ingress packet processing pipeline or the egress packet processing pipeline of the network switch, the network switch would have better packet processing performance. Hence, the proposed hybrid mode packet processing architecture can achieve a balance between flexibility and packet processing performance. By way of example, but not limitation, a packet processing unit located at one of the parallel packet flow paths may be realized using a software-defined networking (SDN) design which is fully programmable, and a packet processing unit located at another one of the parallel packet flow paths may be realized using a legacy hardware design which is more fixed. Further details of the proposed hybrid mode packet processing architecture are described as below.

Figure 1:
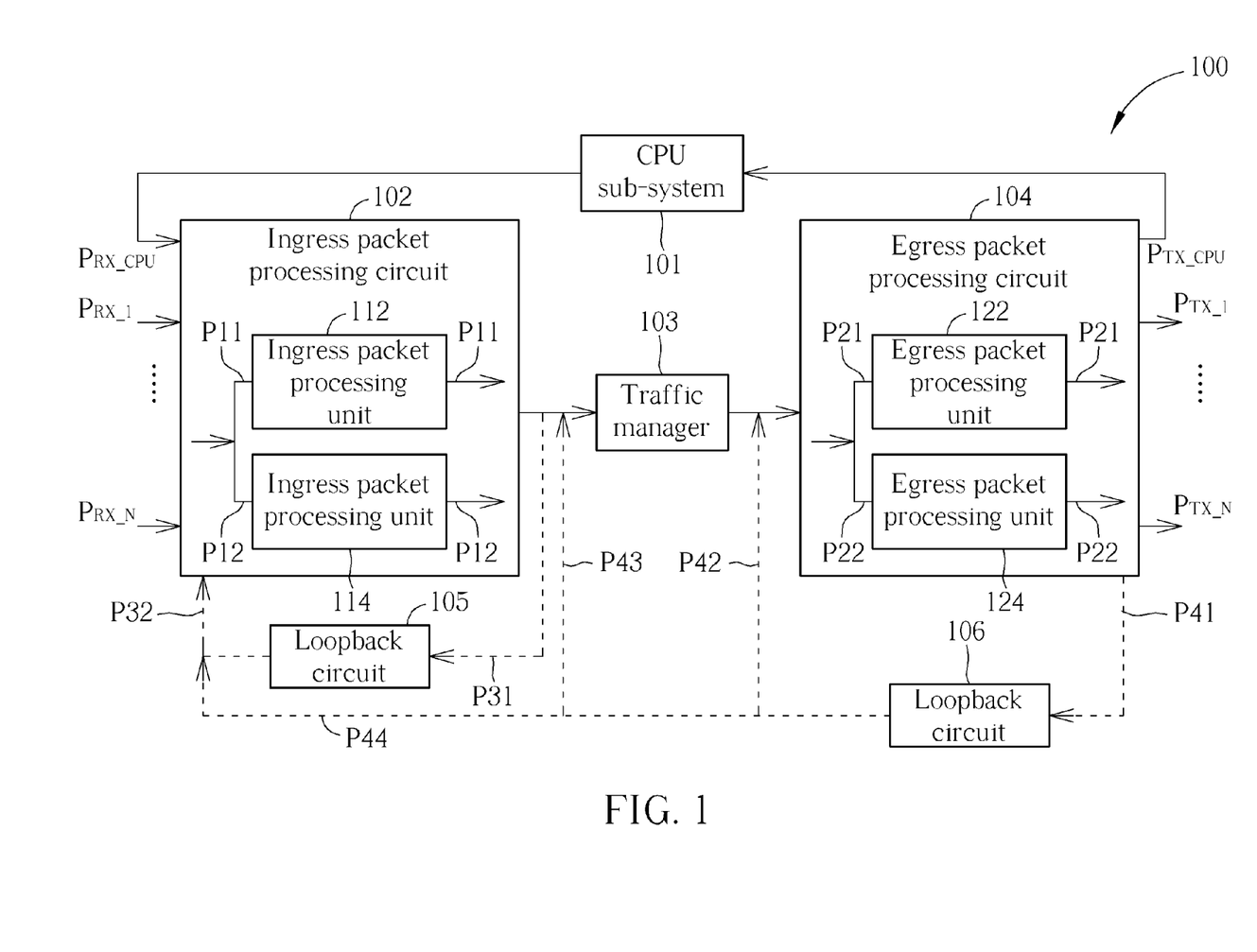
FIG. 1 is a diagram illustrating a simplified packet processing apparatus according to an embodiment of the present invention.

FIG. 1 is a diagram illustrating a simplified packet processing apparatus according to an embodiment of the present invention. The packet processing apparatus 100 is a network switch using the proposed hybrid mode packet processing architecture, and includes a central processing unit (CPU) sub-system 101, an ingress packet processing circuit (e.g., an ingress packet processing pipeline) 102, a traffic manager 103, an egress packet processing circuit (e.g., an egress packet processing pipeline) 104, and a plurality of loopback circuits 105 and 106. Since the packet processing apparatus 100 is equipped with packet switching capability, the packet processing apparatus 100 therefore have a plurality of external ports, including ingress ports $P_{RX\_1}$-$P_{RX\_N}$ and egress ports $P_{TX\_1}$-$P_{TX\_N}$, for receiving ingress packets generated from external source network device(s) and forwarding egress packets to external destination network device(s), where the port number N is a positive integer value which may be adjusted based on the actual design consideration.

In addition, the packet processing apparatus 100 may further include internal ports (or internal interfaces) $P_{RX\_CPU}$ and $P_{TX\_CPU}$ for allowing a packet to be processed by an internal CPU sub-system 101, thus allowing the CPU sub-system 101 to involve in the packet processing to make the packet processing more flexible. For example, when a specific packet is received from one of the ingress port $P_{RX\_1}$-$P_{RX\_N}$, the ingress packet processing circuit 102 may judge that the specific packet should be forwarded to the CPU sub-system 101 for undergoing certain packet processing available in the CPU sub-system 101. The specific packet is transmitted to the internal port $P_{TX\_CPU}$ through the traffic manager 103 and the egress packet processing circuit 104, and then forwarded to the CPU-sub-system 101. Next, the CPU sub-system 101 outputs a processed packet generated from processing the specific packet to the internal port $P_{RX\_CPU}$. Hence, the processed packet is sent back to the ingress packet processing circuit 102. Next, the processed packet will undergo further packet processing through the ingress packet processing circuit 102, the traffic manager 103, and the egress packet processing circuit 104. In the end, the processed packet is forwarded to one of the egress ports $P_{TX\_1}$-$P_{TX\_N}$.

As can be seen from FIG. 1, a packet to be processed by the CPU sub-system 101 is directly received from the internal port $P_{TX\_CPU}$ rather than an external port (e.g., one of egress ports $P_{TX\_1}$-$P_{TX\_N}$ that are connected to different external destination network devices respectively), and a processed packet generated from the CPU sub-system 101 is directly fed into the internal port $P_{RX\_CPU}$ rather than an external port (e.g., one of ingress ports $P_{RX\_1}$-$P_{RX\_N}$ that are connected to different external source network devices respectively). Hence, the CPU sub-system 101 may be regarded as an auxiliary packet processing circuit. It should be noted that the proposed hybrid mode packet processing architecture is employed by at least one main packet processing circuit, including the ingress packet processing circuit 102 and/or the egress packet processing circuit 104. In other words, the proposed hybrid mode packet processing architecture is applied to an internal circuit design of the ingress packet processing circuit 102 and/or an internal circuit design of the egress packet processing circuit 104.

In contrast to the CPU sub-system 101, the ingress packet processing circuit 102 is configured to process ingress packets directly received from ingress ports $P_{RX\_1}$-$P_{RX\_N}$, and the egress packet processing circuit 104 is configured to process egress packets to be directly forwarded through egress ports $P_{TX\_1}$-$P_{TX\_N}$. Further, there is the traffic manager 103 coupled between the preceding ingress packet processing circuit 102 and the following egress packet processing circuit 104. The traffic manager 103 is configured to deal with at least packet queuing and scheduling. In addition, the traffic manager 103 may be further configured to deal with multicast and associated packet replication. As the traffic manager 103 may be implemented using any conventional traffic manager design, further description directed to details of the traffic manager 103 is omitted here for brevity.

In this embodiment, each of the ingress packet processing circuit 102 and the egress packet processing circuit 104 employs the proposed hybrid mode packet processing architecture. The ingress packet processing circuit 102 includes, but not limited to, a plurality of ingress packet processing units, including ingress packet processing units 112 and 114 shown in FIG. 1. Similarly, the egress packet processing circuit 104 includes, but not limited to, a plurality of egress packet processing units, including egress packet processing units 122 and 124 shown in FIG. 1. Concerning the ingress packet processing circuit 102 with the hybrid mode packet processing architecture, the ingress packet processing unit 112 is located at a first ingress packet flow path $P_{11}$, and the ingress packet processing unit 114 is located at a second ingress packet flow path $P_{12}$, wherein the first ingress packet flow path $P_{11}$ is parallel with the second ingress packet flow path $P_{12}$, and programmability of the ingress packet processing unit 112 is higher than programmability of the ingress packet processing unit 114. Concerning the egress packet processing circuit 104 with the hybrid mode packet processing architecture, the egress packet processing unit 122 is located at a first egress packet flow path $P_{21}$, and the egress packet processing unit 124 is located at a second egress packet flow path $P_{22}$, wherein the first egress packet flow path $P_{21}$ is parallel with the second egress packet flow path $P_{22}$, and programmability of the egress packet processing unit 122 is higher than programmability of the egress packet processing unit 124.

In the proposed hybrid mode packet processing architecture, a packet processing unit with higher programmability may be fully programmable, and a packet processing unit with lower programmability may be fixed or semi-configurable. For example, the packet processing unit with higher programmability may be configured to have at least one of a fully programmable packet header extraction and classification capability and a fully programmable action execution capability; and the packet processing unit with lower programmability may be configured to have at least one of a fixed packet header extraction and classification capability and a fixed action execution capability, or at least one of a semi-configurable packet header extraction and classification capability and a semi-configurable action execution capability.

These terms "programmable", "fixed" and "semi-configurable" have well-defined meanings known to those skilled in the pertinent art. By way of example, but not limitation, a packet processing unit that is fully programmable is allowed to support any user-defined functional setting to perform a user-defined function; a packet processing unit that is fixed is allowed to support only a single functional setting, where the single functional setting may be set at the time the packet processing unit is manufactured, and may not allow any modification after the packet processing unit is manufactured; and a packet processing unit that is semi-configurable is allowed to support a restricted number of pre-defined functional settings and can be controlled to switch between the pre-defined functional settings only. The above is for illustrative purposes only, and is not meant to be a limitation of the present invention. Any combination of packet processing units connected in a parallel fashion and equipped with different programmability falls within the scope of the present invention.

Concerning the ingress packet processing circuit 102, its main function is to identify a packet header of each ingress packet, such that one or more actions can be taken based on the identified packet header. In accordance with the actual design consideration, the action(s) may be performed upon a packet by using a combination of the ingress packet processing circuit 102 and the egress packet processing circuit 102 or by solely using the egress packet processing circuit 102.

In a case where each of the ingress packet processing units 112 and 114 is used to perform packet header extraction and classification (e.g., extract a packet header of an ingress packet and perform packet classification based on the extracted packet header) only, the ingress packet processing unit 112 may be implemented using a flexible packet processing unit having a fully programmable packet header extraction and classification capability, and the ingress packet processing unit 114 may be implemented using a fixed packet processing unit having a fixed packet header extraction and classification capability or a semi-configurable packet processing unit having a semi-configurable packet header extraction and classification capability.

In another case where each of the ingress packet processing units 112 and 114 is used to perform packet header extraction and classification and further perform action execution (e.g., packet modification, metering, accounting, etc.) based on the classification result, the ingress packet processing unit 112 may be implemented using a flexible packet processing unit having a fully programmable packet header extraction and classification capability and a fully programmable action execution capability; and the ingress packet processing unit 114 may be implemented using a fixed packet processing unit having a fixed packet header extraction and classification capability and a fixed action execution capability, or a semi-configurable packet processing unit having a semi-configurable packet header extraction and classification capability and a semi-configurable action execution capability.

Concerning the egress packet processing circuit 104, each of the ingress packet processing units 112 and 114 may be used to perform action execution only. Hence, the egress packet processing unit 122 may be implemented using a flexible packet processing unit having a fully programmable action execution capability; and the egress packet processing unit 124 may be implemented using a fixed packet processing unit having a fixed action execution capability or a semi-configurable packet processing unit having a semi-configurable action execution capability.

By way of example, the aforementioned flexible packet processing unit may be built by one or more flow engines (e.g., OpenFlow flow engine(s)). Hence, the flexible packet processing unit is neither a CPU nor a NPU (network processing unit) built in the ingress packet processing circuit 102 and the egress packet processing circuit 104. Alternatively, the aforementioned flexible packet processing unit may be built by one programmable state machine.

As shown in FIG. 1, one loopback circuit 105 is configured to make an ingress packet (which is generated from the ingress packet processing circuit 102) fed into the ingress packet processing circuit 102 again for further packet processing, and another loopback circuit 106 is configured to make an egress packet (which is generated from the egress packet processing circuit 104) fed into the ingress packet processing circuit 102 again for further packet processing or fed into the egress packet processing circuit 104 again for further packet processing. The use of the loopback circuits 105 and 106 can simplify the overall network switch design due to reusing the ingress packet processing circuit 102 and the egress packet processing circuit 104. As shown in FIG. 1, the loopback circuit 105 may be located at a first loopback path composed of packet flow paths $P_{31}$ and $P_{32}$; and the loopback circuits 106 may be located at a second loopback path composed of packet flow paths $P_{41}$ and $P_{42}$, a third loopback path composed of packet flow paths $P_{41}$ and $P_{43}$, or a fourth loopback path composed of packet flow paths $P_{41}$ and $P_{44}$. In this embodiment, each of the loopback circuits 105 and 106 may be a first-in first-out (FIFO) buffer.

It should be noted that FIG. 1 only shows fundamental circuit elements of the hybrid mode packet processing architecture used by each of the ingress packet processing circuit 102 and the egress packet processing circuit 104. In practice, the ingress packet processing circuit 102 and the egress packet processing circuit 104 may include additional circuit elements, as shown in FIG. 2 and FIG. 3.

Figure 2:
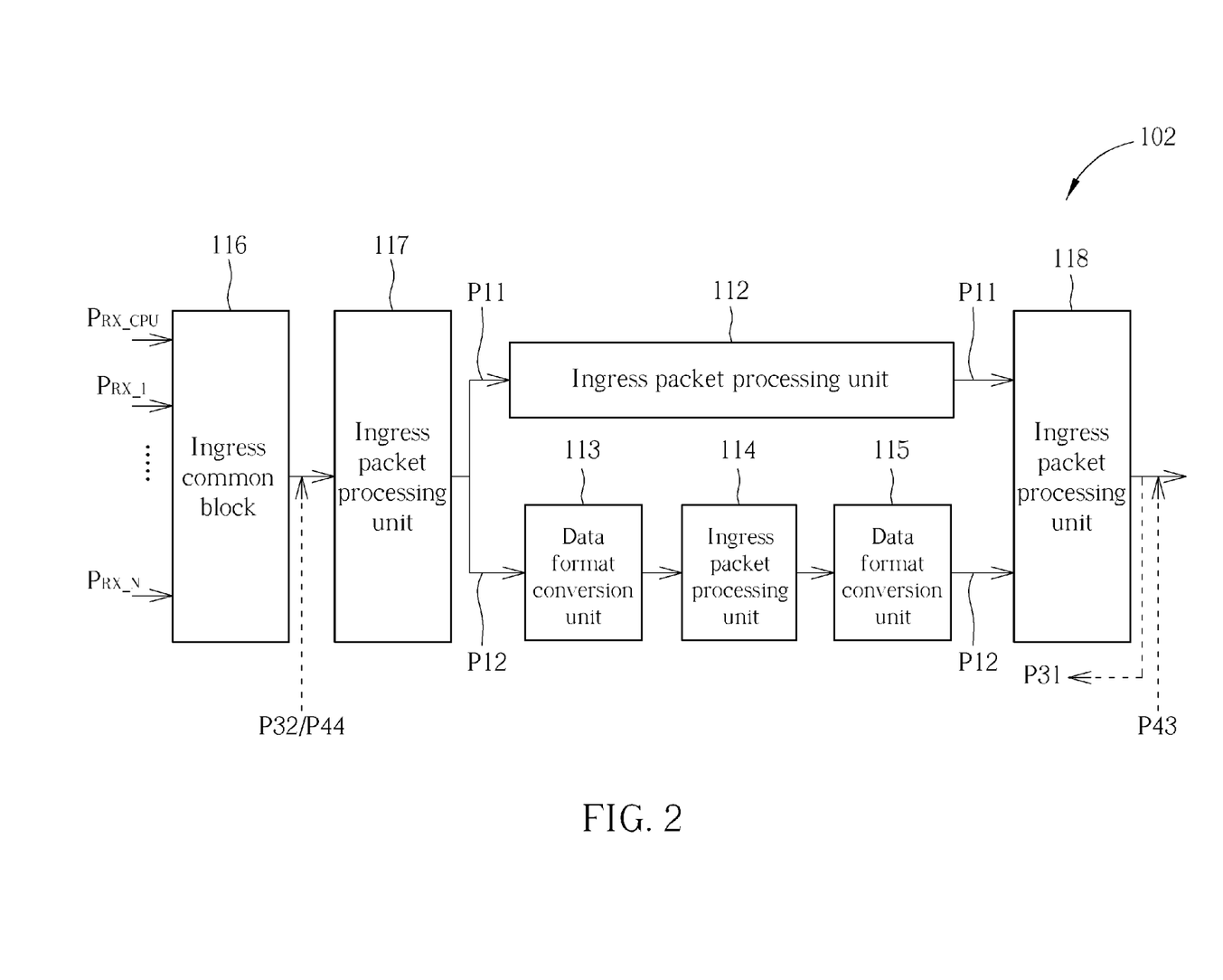
FIG. 2 is a diagram illustrating a detailed diagram of the ingress packet processing circuit shown in FIG. 1 according to an embodiment of the present invention.
Figure 3:
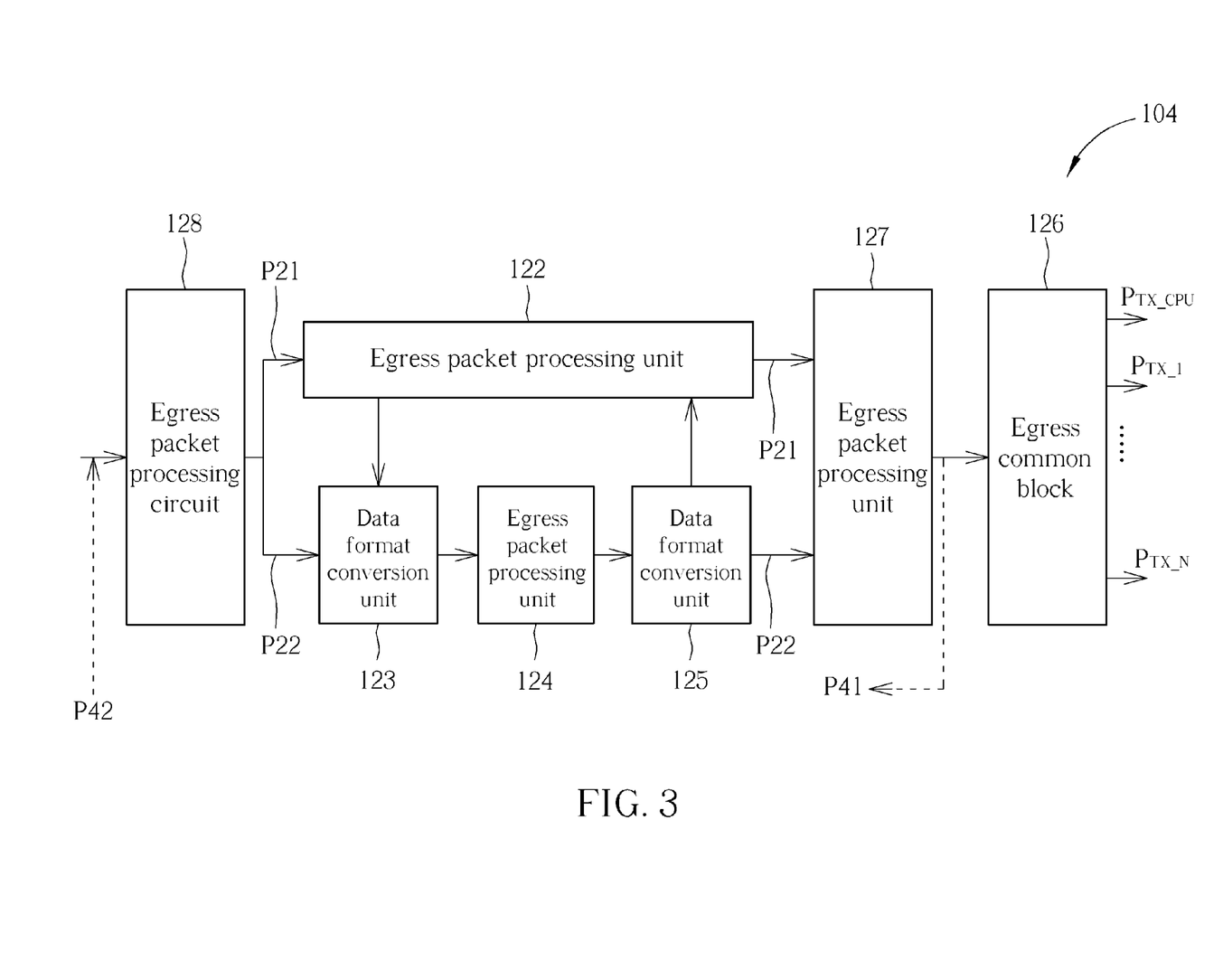
FIG. 3 is a diagram illustrating a detailed diagram of the egress packet processing circuit shown in FIG. 1 according to an embodiment of the present invention.
Figure 4:
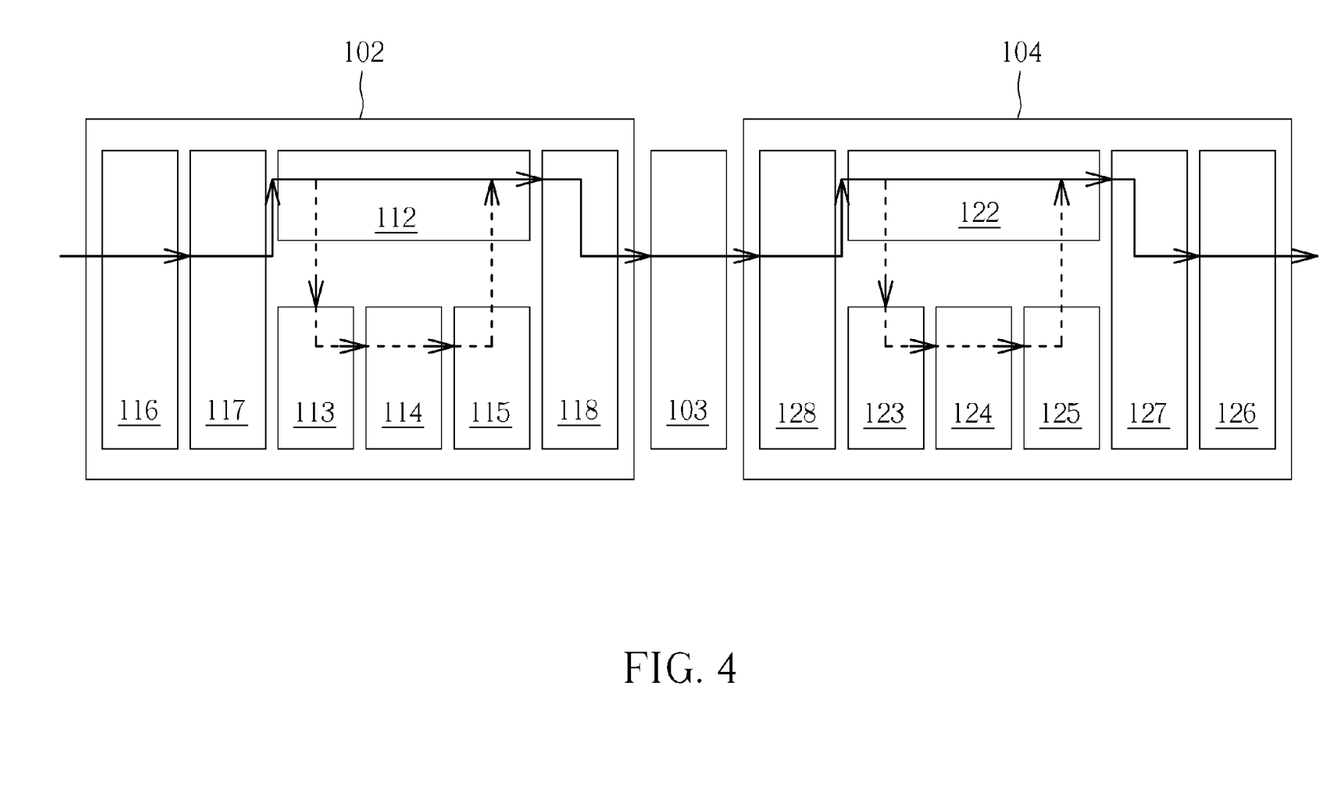
FIG. 4 is a diagram illustrating a first packet processing flow supported by the packet processing apparatus shown in FIG. 1.
Figure 5:
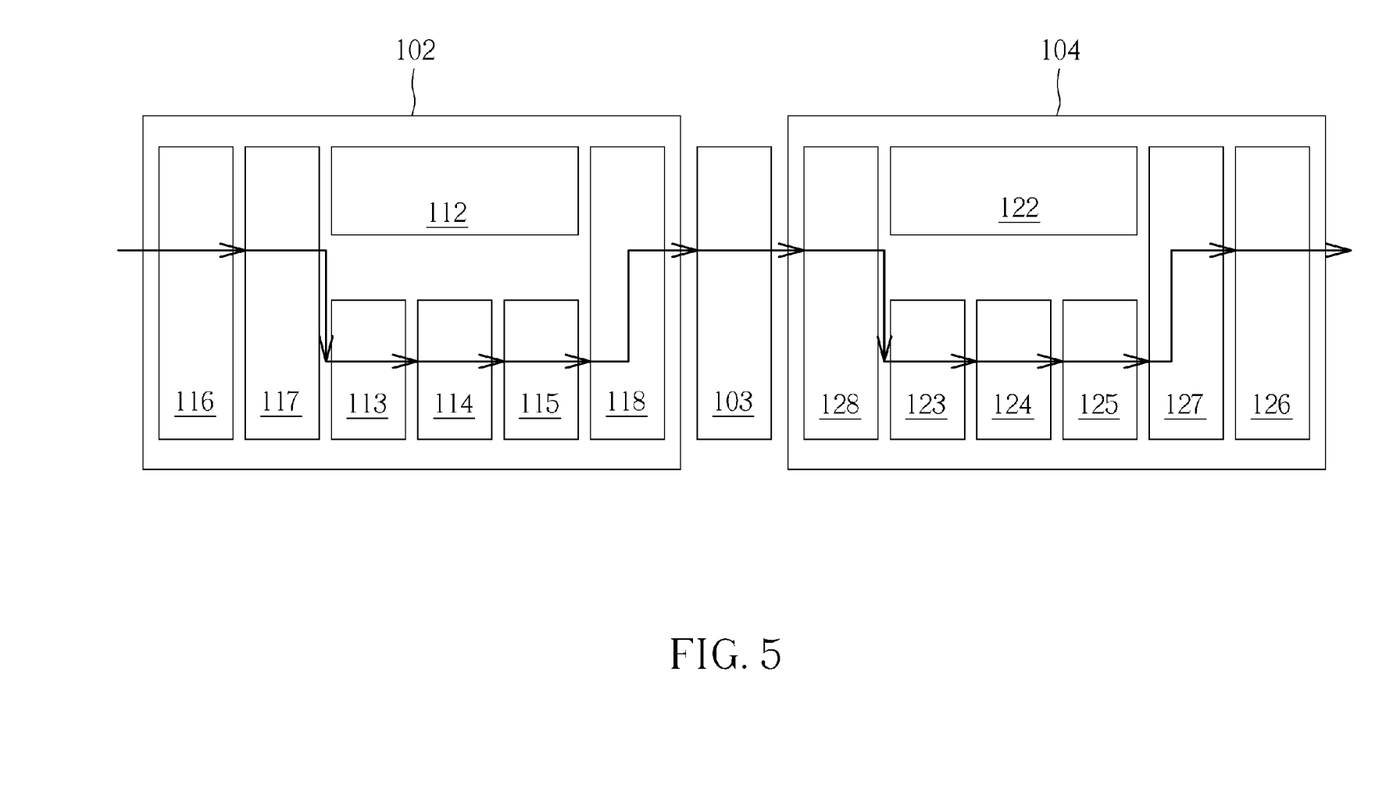
FIG. 5 is a diagram illustrating a second packet processing flow supported by the packet processing apparatus shown in FIG. 1.
Figure 6:
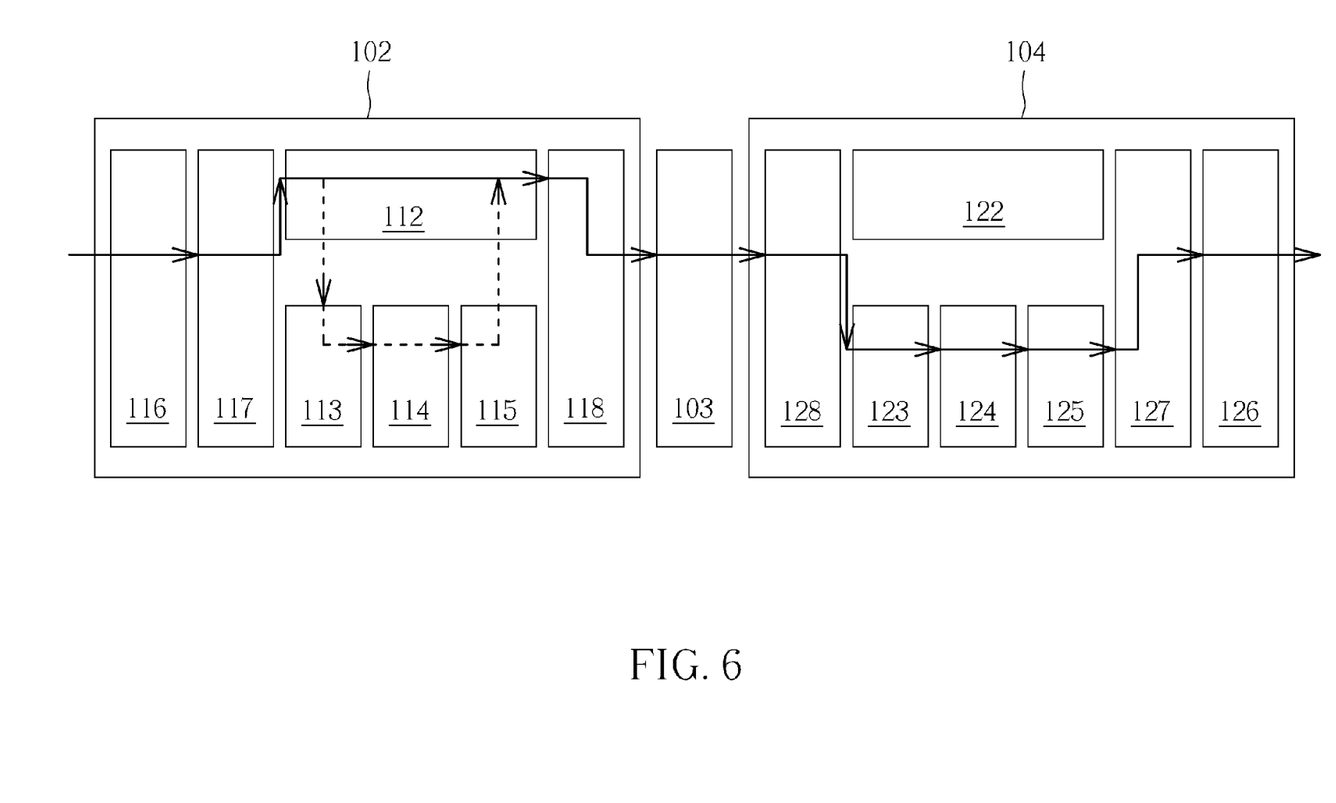
FIG. 6 is a diagram illustrating a third packet processing flow supported by the packet processing apparatus shown in FIG. 1.
Figure 7:
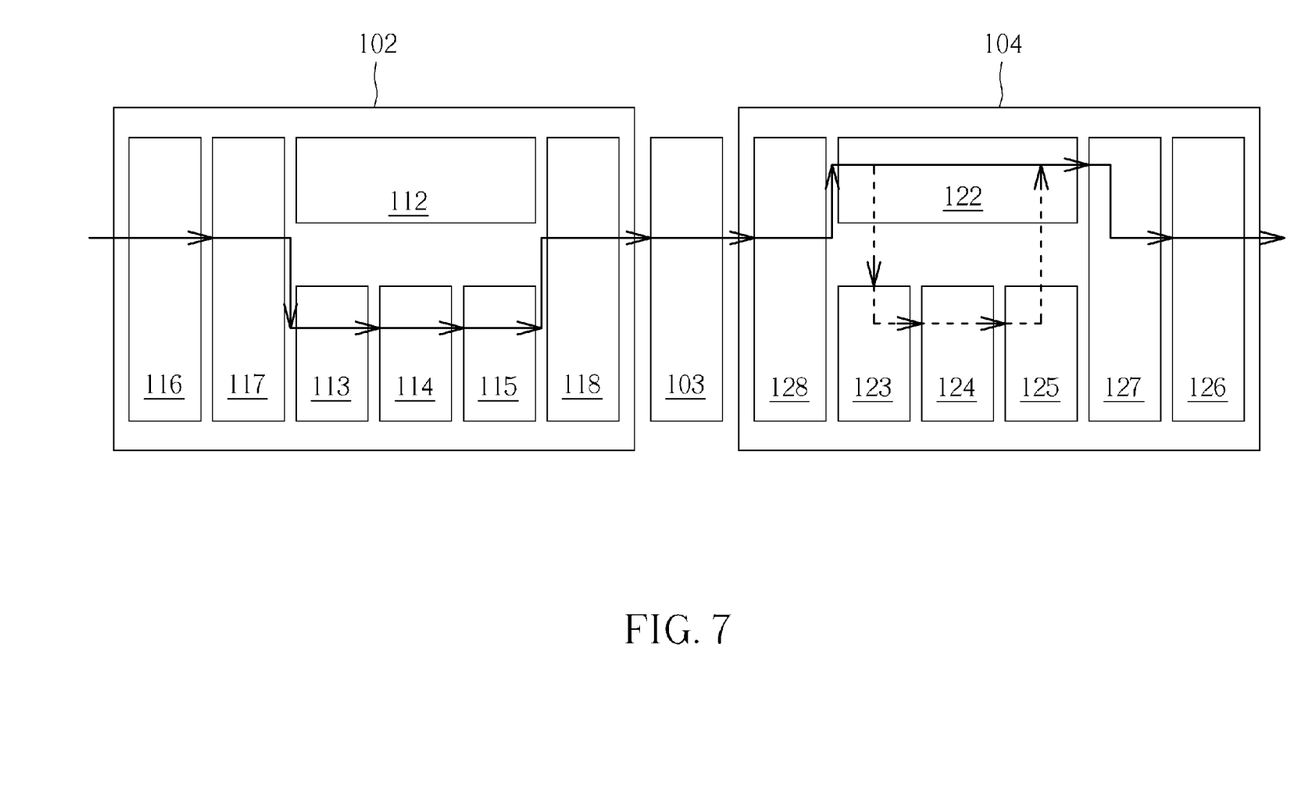
FIG. 7 is a diagram illustrating a fourth packet processing flow supported by the packet processing apparatus shown in FIG. 1.

FIG. 2 is a diagram illustrating a detailed diagram of the ingress packet processing circuit 102 shown in FIG. 1 according to an embodiment of the present invention. In this embodiment, the ingress packet processing circuit 102 further includes a plurality of data format conversion units 113, 115, an ingress common block 116, and a plurality of ingress packet processing units 117, 118. The programmability of the ingress packet processing unit 117 is higher than the programmability of the ingress packet processing unit 114, and the programmability of the ingress packet processing unit 118 is also higher than the programmability of the ingress packet processing unit 114. For example, each of the ingress packet processing units 117 and 118 is fully programmable. Further, based on the actual design of the ingress packet processing circuit 102, the ingress packet processing unit 118 may be configured to have a fully programmable packet header extraction and classification capability, or have a fully programmable packet header extraction and classification capability and a fully programmable action execution capability.

The ingress common block 116 and the ingress packet processing unit 117 are used to dispatch an ingress packet to one of the ingress packet processing unit 112 located at the first ingress packet flow path $P_{11}$ and the ingress packet processing unit 114 located at the second ingress packet flow path $P_{12}$. For example, the ingress common block 116 makes an initial packet dispatch decision, and the ingress packet processing unit 117 makes a final packet dispatch decision based on the initial packet dispatch decision. Each ingress packet generated from the ingress packet processing unit (e.g., a flexible packet processing unit) 117 has a first data format acknowledgeable to the ingress packet processing unit (e.g., a flexible packet processing unit) 112, and each ingress packet generated from the ingress packet processing unit (e.g., a flexible packet processing unit) 112 has the first data format acknowledgeable to the ingress packet processing unit (e.g., a flexible packet processing unit) 118.

As the hardware configuration of the ingress packet processing unit (e.g., a fixed packet processing unit or a semi-configurable packet processing unit) 114 is different from the hardware configuration of the ingress packet processing units (e.g., flexible packet processing units) 112, 117 and 118, the ingress packet processing unit 114 may support a second data format different from the first data format. To make the ingress packet processing unit 114 works normally, data format conversion units 113 and 115 are located at the second ingress packet flow path $P_{12}$ where the ingress packet processing unit 114 is located. Specifically, one data format conversion unit 113 is placed before the ingress packet processing unit 114, and another data format conversion unit 115 is placed after the ingress packet processing unit 114.

The data format conversion unit 113 is configured to convert a first data input (e.g., an ingress packet) with the first data format acknowledgeable to the ingress packet processing units 112, 117, 118 into a second data input (e.g., an ingress packet) with the second data format acknowledgeable to the ingress packet processing unit 114, and transmit the second data input to the ingress packet processing unit 114. The data format conversion unit 115 is configured to receive a second data output (e.g., an ingress packet) with the second data format from the ingress packet processing unit 114, convert the second data output into a first data output (e.g., an ingress packet) with the first data format, and transmit the first data output to the ingress packet processing unit 118.

It should be noted that the ingress packet processing unit 114 may also be used to act as a co-processor or an accelerator of the ingress packet processing unit 112. For example, the ingress packet processing unit 114 may be implemented using a fixed/semi-configurable packet processing unit. Hence, compared to the ingress packet processing unit 112 implemented using a flexible packet processing unit, the ingress packet processing unit 114 may have a faster processing speed for certain packet processing, or may operate more efficiently (such as consuming less memory resource). The ingress packet processing unit 112 can benefit from the high processing speed of the ingress packet processing unit 114 to enhance its packet processing performance. Thus, when the co-processing/acceleration function is enabled, the ingress packet processing unit 112 is further configured to perform data transaction with the ingress packet processing unit 114 through data format conversion units 113 and 115.

In a case where a specific ingress packet is dispatched from the ingress packet processing unit 117 to the ingress packet processing unit 112, when the co-processing/acceleration function is not enabled, data format conversion units 113, 115 and ingress packet processing unit 114 may be inactive during a period in which the ingress packet processing unit 112 is active to process the specific ingress packet; or when the co-processing/acceleration function is enabled, data format conversion units 113, 115 and ingress packet processing unit 114 may also be active during the period in which the ingress packet processing unit 112 is active to process the specific ingress packet. In another case where a specific ingress packet is dispatched from the ingress packet processing unit 117 to the ingress packet processing unit 114, the ingress packet processing unit 112 may be inactive during a period in which data format conversion units 113, 115 and ingress packet processing unit 114 are active to process the specific ingress packet.

Please refer to FIG. 1 in conjunction with FIG. 2. When the first loopback path is employed in the packet processing apparatus 100, the packet flow path $P_{31}$ of the first loopback path is coupled between an output terminal of the ingress packet processing unit 118 and the loopback circuit 105, and the packet flow path $P_{32}$ of the first loopback path is coupled between the loopback circuit 105 and an input terminal of the ingress packet processing unit 117. Hence, the loopback circuit 105 is used to make an ingress packet generated from the ingress packet processing unit 118 fed into the ingress packet processing unit 117.

When the third loopback path is employed in the packet processing apparatus 100, the packet flow path $P_{43}$ of the third loopback path is coupled between an output terminal of the ingress packet processing unit 118 (or an input terminal of the traffic manager 103) and the loopback circuit 106. Hence, the loopback circuit 106 is used to make an egress packet generated from the egress packet processing circuit 104 fed into the traffic manager 103.

When the fourth loopback path is employed in the packet processing apparatus 100, the packet flow path $P_{44}$ of the fourth loopback path is coupled between an input terminal of the ingress packet processing unit 117 and the loopback circuit 106. Hence, the loopback circuit 106 is used to make an egress packet generated from the egress packet processing circuit 104 fed into the ingress packet processing unit 117.

FIG. 3 is a diagram illustrating a detailed diagram of the egress packet processing circuit 104 shown in FIG. 1 according to an embodiment of the present invention. In this embodiment, the egress packet processing circuit 104 further includes a plurality of data format conversion units 123, 125, an egress common block 126, and a plurality of egress packet processing units 127, 128. The programmability of the egress packet processing unit 127 is higher than the programmability of the egress packet processing unit 124, and the programmability of the egress packet processing unit 128 is also higher than the programmability of the egress packet processing unit 124. For example, each of the egress packet processing units 127 and 128 is fully programmable. Further, based on the actual design of the egress packet processing circuit 104, the egress packet processing unit 127 may be configured to have a fully programmable action execution capability.

The egress packet processing unit 128 is used to dispatch an egress packet from the traffic manager 103 to one of the egress packet processing unit 122 located at the first egress packet flow path $P_{21}$ and the egress packet processing unit 124 located at the second egress packet flow path $P_{22}$. Each egress packet generated from the egress packet processing unit (e.g., a flexible packet processing unit) 128 has the first data format acknowledgeable to the egress packet processing unit (e.g., a flexible packet processing unit) 122, and each egress packet generated from the egress packet processing unit (e.g., a flexible packet processing unit) 122 has the first data format acknowledgeable to the egress packet processing unit (e.g., a flexible packet processing unit) 127.

As the hardware configuration of the egress packet processing unit (e.g., a fixed packet processing unit or a semi-configurable packet processing unit) 124 is different from the hardware configuration of the egress packet processing units (e.g., flexible packet processing units) 122, 127 and 128, the egress packet processing unit 124 may support the second data format different from the first data format. To make the egress packet processing unit 124 works normally, data format conversion units 123 and 125 are located at the second egress packet flow path $P_{22}$ where the egress packet processing unit 124 is located. Specifically, one data format conversion unit 123 is placed before the egress packet processing unit 124, and another data format conversion unit 125 is placed after the egress packet processing unit 124.

The data format conversion unit 123 is configured to convert a first data input (e.g., an egress packet) with the first data format acknowledgeable to the egress packet processing units 122, 127, 128 into a second data input (e.g., an egress packet) with the second data format acknowledgeable to the egress packet processing unit 124, and transmit the second data input to the egress packet processing unit 124. The data format conversion unit 125 is configured to receive a second data output (e.g., an egress packet) with the second data format from the egress packet processing unit 124, convert the second data output into a first data output (e.g., an egress packet) with the first data format, and transmit the first data output to the egress packet processing unit 127.

It should be noted that the egress packet processing unit 124 may also be used to act as a co-processor or an accelerator of the egress packet processing unit 122. For example, the egress packet processing unit 124 may be implemented using a fixed/semi-configurable packet processing unit. Hence, compared to the egress packet processing unit 122 implemented using a flexible packet processing unit, the egress packet processing unit 124 may have a faster processing speed for certain packet processing, or may operate more efficiently (such as consuming less memory resource). The egress packet processing unit 122 can benefit from the high processing speed of the egress packet processing unit 124 to enhance its packet processing performance. Thus, when the co-processing/acceleration function is enabled, the egress packet processing unit 122 is further configured to perform data transaction with the egress packet processing unit 124 through data format conversion units 123 and 125.

In a case where a specific egress packet is dispatched from the egress packet processing unit 128 to the egress packet processing unit 122, when the co-processing/acceleration function is not enabled, data format conversion units 123, 125 and egress packet processing unit 124 may be inactive during a period in which the egress packet processing unit 122 is active to process the specific egress packet; or when the co-processing/acceleration function is enabled, data format conversion units 123, 125 and egress packet processing unit 124 may also be active during the period in which the egress packet processing unit 122 is active to process the specific egress packet. In another case where a specific egress packet is dispatched from the egress packet processing unit 128 to the egress packet processing unit 124, the egress packet processing unit 122 may be inactive during a period in which the data format conversion units 123, 125 and the egress packet processing unit 124 are active to process the specific egress packet.

Please refer to FIG. 1 in conjunction with FIG. 3. The packet flow path $P_{41}$ is coupled between an output terminal of the egress packet processing unit 127 and the loopback circuit 106. Hence, when any of the second loopback path (which is composed of packet flow paths $P_{41}$ and $P_{42}$), the third loopback path (which is composed of packet flow paths $P_{41}$ and $P_{43}$) and the fourth loopback path (which is composed of packet flow paths $P_{41}$ and $P_{44}$) is employed in the packet processing apparatus 100, the loopback circuit 106 obtains an egress packet generated from the egress packet processing unit 127 in the egress packet processing circuit 104. Further, when the second loopback path is employed in the packet processing apparatus 100, the packet flow path $P_{42}$ of the second loopback path is coupled between an input terminal of the egress packet processing unit 128 (or an output terminal of the traffic manager 103) and the loopback circuit 106. Hence, the loopback circuit 106 is used to make an egress packet generated from the egress packet processing unit 127 fed into the egress packet processing unit 128.

As shown in FIG. 1, both of the ingress packet processing circuit 102 and the egress packet processing circuit 104 employ the proposed hybrid mode packet processing architecture. In other words, each of the ingress packet processing circuit 102 and the egress packet processing circuit 104 has two parallel packet flow paths. For example, one packet flow path offers flexible packet processing, and the other packet flow path offers fixed packet processing or semi-configurable packet processing. Hence, based on the selection of active packet flow paths in the ingress packet processing circuit 102 and the egress packet processing circuit 104, the packet processing apparatus 100 may support four packet processing flows, as illustrated in FIG. 4-FIG. 7. For clarity and simplicity, no loopback is involved in the illustrated packet processing flows. As a person skilled in the art can readily understand details of the packet processing flows shown in FIG. 4-FIG. 7 after reading above paragraphs, further description is omitted here for brevity.

In above exemplary embodiment shown in FIG. 1, both of the ingress packet processing circuit 102 and the egress packet processing circuit 104 employ the proposed hybrid mode packet processing architecture, and are accompanied by respective loopback circuits 105 and 106. However, this is for illustrative purposes only, and is not meant to be a limitation of the present invention. In one alternative design, the packet processing apparatus 100 may be modified to omit one or both of the loopback circuits 105 and 106. In another alternative design, the packet processing apparatus 100 may be modified to replace one of the ingress packet processing circuit 102 and the egress packet processing circuit 104 with a conventional packet processing circuit (i.e., a packet processing circuit without using the proposed hybrid mode packet processing architecture).

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A packet processing apparatus, comprising:
an ingress packet processing circuit, configured to process ingress packets received from ingress ports;
an egress packet processing circuit, configured to process egress packets to be forwarded through egress ports;
a traffic manager, coupled between the ingress packet processing circuit and the egress packet processing circuit, wherein the traffic manager is configured to deal with at least packet queuing and scheduling; and
wherein the ingress packet processing circuit comprises:
a first packet processing circuit, located at a first packet flow path;
a second packet processing circuit, located at a second packet flow path, wherein the first packet flow path is parallel with the second packet flow path, and programmability of the first packet processing circuit is higher than programmability of the second packet processing circuit;
a third packet processing circuit, configured to process ingress packets generated from any of the first packet processing circuit and the second packet processing circuit, wherein programmability of the third packet processing circuit is higher than the programmability of the second packet processing circuit; and
a fourth packet processing circuit, configured to dispatch an ingress packet to at least one of the first packet processing circuit and the second packet processing circuit, wherein programmability of the fourth packet processing circuit is higher than the programmability of the second packet processing circuit; and
a loopback circuit, configured to:
make an ingress packet generated from the third packet processing circuit fed into the fourth packet processing circuit.

2. The packet processing apparatus of claim 1, wherein the first packet processing circuit is configured to have at least one of a fully programmable packet header extraction and classification capability and a fully programmable action execution capability.

3. The packet processing apparatus of claim 2, wherein the first packet processing circuit comprises one or more flow engines.

4. The packet processing apparatus of claim 1, wherein the second packet processing circuit is configured to have at least one of a fixed packet header extraction and classification capability and a fixed action execution capability.

5. The packet processing apparatus of claim 1, wherein the second packet processing circuit is configured to have at least one of a semi-configurable packet header extraction and classification capability and a semi-configurable action execution capability.

6. The packet processing apparatus of claim 1, further comprising:
a first data format conversion circuit, located at the second packet flow path, wherein the first data format conversion circuit is configured to convert a first data input with a first data format acknowledgeable to the first packet processing circuit into a second data input with a second data format acknowledgeable to the second packet processing circuit, and transmit the second data input to the second packet processing circuit; and a second data format conversion circuit, located at the second packet flow path, wherein the second data format conversion circuit is configured to receive a second data output with the second data format from the second packet processing circuit, and convert the second data output into a first data output with the first data format.

7. The packet processing apparatus of claim 1, wherein the second packet processing circuit is further configured to act as a co-processor or an accelerator of the first packet processing circuit, and the first packet processing circuit is configured to perform data transaction with the second packet processing circuit.

8. A packet processing apparatus, comprising:
an ingress packet processing circuit, configured to process ingress packets received from ingress ports;
an egress packet processing circuit, configured to process egress packets to be forwarded through egress ports;
a traffic manager, coupled between the ingress packet processing circuit and the egress packet processing circuit, wherein the traffic manager is configured to deal with at least packet queuing and scheduling; and
wherein the egress packet processing circuit comprises:
a first packet processing circuit, located at a first packet flow path;
a second packet processing circuit, located at a second packet flow path, wherein the first packet 'flow path is parallel with the second packet flow path, and programmability of the 'first packet processing circuit is higher than programmability of the second packet processing circuit;
a third packet processing circuit, configured to dispatch an egress packet to at least one of the first packet processing circuit and the second packet processing circuit, wherein programmability of the third packet processing circuit is higher than the programmability of the second packet processing circuit; and
a fourth packet processing circuit, configured to process egress packets generated from any of the first packet processing circuit and the second packet processing circuit, wherein programmability of the fourth packet processing circuit is higher than the programmability of the second packet processing circuit; and
a loopback circuit, configured to:
make an egress packet generated from the fourth packet processing circuit fed into the third packet processing circuit.

* * * * *

UNITED STATES PATENT AND TRADEMARK OFFICE
CERTIFICATE OF CORRECTION

PATENT NO. : 9,674,084 B2  Page 1 of 1
APPLICATION NO. : 14/462575
DATED : June 6, 2017
INVENTOR(S) : Kuo-Cheng Lu et al.

It is certified that error appears in the above-identified patent and that said Letters Patent is hereby corrected as shown below:

On the Title Page

Item (73), correct the address and country of the assignee from "Anhui, PR (US)" to --Anhui (CN)--.

Signed and Sealed this
Eighth Day of August, 2017

Joseph Matal
*Performing the Functions and Duties of the*
*Under Secretary of Commerce for Intellectual Property and*
*Director of the United States Patent and Trademark Office*